US006823078B1

United States Patent
Florent et al.

(10) Patent No.: US 6,823,078 B1
(45) Date of Patent: Nov. 23, 2004

(54) IMAGE PROCESSING METHOD, SYSTEM AND APPARATUS FOR NOISE REDUCTION IN AN IMAGE SEQUENCE REPRESENTING A THREADLIKE STRUCTURE

(75) Inventors: Raoul Florent, Vlenton (FR); Lucile Goubet, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 463 days.

(21) Appl. No.: 09/697,389

(22) Filed: Oct. 26, 2000

(30) Foreign Application Priority Data

Oct. 26, 1999 (EP) .......................................... 99402662

(51) Int. Cl.[7] .............................. G06K 9/00; A61B 6/00; G01N 23/00; G21K 1/12; H05G 1/60
(52) U.S. Cl. ........................................ 382/132; 378/19
(58) Field of Search ............................ 382/132; 378/19

(56) References Cited

U.S. PATENT DOCUMENTS

| 5,161,178 A | * | 11/1992 | Honda et al. ............. 378/98.12 |
| 5,289,373 A | * | 2/1994 | Zarge et al. ................ 600/434 |
| 5,809,105 A | | 9/1998 | Roehm et al. ............ 379/98.12 |
| 6,574,300 B1 | * | 6/2003 | Florent et al. ................. 378/19 |

FOREIGN PATENT DOCUMENTS

| EP | 0755023 A1 | 1/1997 | ............. G06T/5/20 |
| EP | 0840252 A1 | 5/1998 | ............. G06T/5/00 |
| EP | 0751482 A1 | 1/1999 | ............. G06T/5/00 |

OTHER PUBLICATIONS

Aufrichtig, R., Wilson, D.L.; X–ray Fluoroscopy Spatio–Temporal Filtering with Object Detection, Medical Imaging, IEEE Transactions on , vol.: 14 Issue: 4 , Dec. 1995, pp.: 733–746.*

* cited by examiner

Primary Examiner—Leo Boudreau
Assistant Examiner—Hussein Akhavannik
(74) Attorney, Agent, or Firm—John Vodopia

(57) ABSTRACT

The invention relates to an image processing method for noise filtering an image sequence representing a threadlike structure on a background, including an acquisition of point data in first and second sequence images and an estimation of the corresponding filtered point data for constructing a filtered second image. The method is, performed in each sequence image, and includes:

extracting the threadlike structure points, forming strings from the extracted points, temporally filtering the data of the points located outside the strings denoted background points, spatially filtering the data of the string points, and constructing the filtered second image data by performing an insertion of the spatially filtered data of the string points into the temporally filtered data of the background points.

9 Claims, 3 Drawing Sheets

IMAGE PROCESSING METHOD, SYSTEM AND APPARATUS FOR NOISE REDUCTION IN AN IMAGE SEQUENCE REPRESENTING A THREADLIKE STRUCTURE

BACKGROUND OF THE INVENTION

The invention relates to an image processing method for noise reduction in a sequence of noisy images representing a threadlike structure on a background. The invention particularly relates to noise reduction method applied to a sequence of medical X-ray fluoroscopy images representing a catheter guide-wire. The invention also relates to a system for carrying out this method and to an examination apparatus having means for image processing. The invention is applied to the medical imaging.

SUMMARY OF THE INVENTION

An image processing system for filtering X-ray fluoroscopic image sequence is already known of a U.S. Pat. No. 5,809,105. This document discloses means for acquiring one image by passing X-rays through a subject, said image comprising an array of pixel values, means for receiving the image and producing a mask therefrom which distinguishes the pixel values that correspond to structural features in the image from the pixel values that correspond to background and means being responsive to the mask for selectively filtering the pixel values in the image that correspond to background. The means for filtering the background pixel values include a Poisson filter which is spatial filter. So, the mask is used to select the background pixels for filtering the background noise while enabling the structural pixels to pass unfiltered to the display.

This known method does not provide means to detect object motion in an image sequence. By use of the method it may be difficult to filter the background by applying the mask without degradation of said structural features, especially if they represent a very thin threadlike structure. The mask may cover up said threadlike structure when a non-detected swift motion occurs. Besides, this known method does not provide means to eliminate phantom artifacts. Furthermore, this known method does not provide means for noise filtering the object pixels themselves. This is a drawback because the boundaries of a thin threadlike structure may be blurred by noise, which makes said threadlike structure difficult to localize, whereas the central points of the threadlike structure may be sputtering due to noise, which makes this threadlike structure difficult to visualize, even when the background has been noise filtered. Moreover, the known method does not permit enhancement of the structural features with respect to the background. This is a drawback when the thin threadlike structure presents little contrast with respect to a noisy cluttered background.

In cardiology, a sequence of images may be formed of images representing blood vessels called arteriogram images used to visualize in real time medical procedures of introducing a catheter in a vessel. Such medical procedures deeply rely on the correct visibility of a metallic guide-wire, which is introduced in the vessel for guiding the catheter. These fluoroscopic digital images are noisy because they are formed with a low level of X-rays. It is very important to improve considerably the guide-wire visualization in image sequences formed in the X-ray fluoroscopic mode in order to help the practitioner direct the catheter in the arteries thereby avoiding damage said arteries during this operation.

The invention aims at providing an image processing method to be applied to a noisy image sequence representing a threadlike structure on a background, at improving the background noise reduction without degradation of said threadlike structure, at eliminating the phantom artifacts and at noise filtering and enhancing the threadlike structure in real time, for example at a rate of about 25 images per second.

These aims are reached by an image processing method for noise filtering an image sequence representing a threadlike structure on a background, including an acquisition of point data in first and second sequence images and an estimation of the corresponding filtered point data for constructing a filtered second image, the point data being the intensities associated to co-ordinates of image points, said method comprising, performed in each sequence image, steps of: extracting the threadlike structure points, forming strings from said extracted points, temporally filtering the data of the points located outside the strings denoted background points, spatially filtering the data of the string points, and constructing the filtered second image data by performing an insertion of the spatially filtered data of the string points into the temporally filtered data of the background points.

Advantages of this method are that the object of interest localization is much more accurate, while the processing method is carried out in real time.

A system to carry out said method includes a computer program product comprising a set of instruction for carrying out a method of image processing for noise filtering an image sequence representing a threadlike structure on a background; and an examination apparatus with a system and means for carrying out the processing method as claimed in claim 6, including an enhancement operation performed on spatially filtered string point data, comprising steps of: selecting string points [A(i,j)] using the list of the control signal [St(i, j)], enhancing the string point data with respect to their local environment, and constructing a filtered second image data by performing an insertion of the enhanced spatially filtered data of the string points into the temporally filtered data of the background points, controlled by the binary control signal.

BRIEF DESCRIPTION OF THE DRAWINGS

The invention is described thereafter in detail in reference to diagrammatic figures, wherein.

DESCRIPTION OF THE PREFERRED EMBODIMENTS

The invention relates to an image processing method for noise filtering an image sequence representing a threadlike structure, possibly moving on a background, including an acquisition of the point data in first and second sequence images and an estimation of the corresponding filtered point data to reconstruct a noise filtered second image. By threadlike structure, one understands an elongated shaped object, having a transversal dimension of 1 to 10 pixels, possibly 1 to 3 pixels, in a digital image. The point data are the intensities and co-ordinates of the points in the images.

In an example described hereafter, the invention particularly relates to a noise reduction method applied to a sequence of medical X-ray fluoroscopic noisy images representing a threadlike structure that is a catheter guide-wire on a cluttered background. The image processing method aims at reconstructing an improved sequence of images where the point intensities of the guide-wire are noise filtered and enhanced with respect to a filtered background. One problem lies in the selection of the points that must be both filtered and enhanced as guide-wire points, or that must be filtered as background points, in the sequence images. This problem is solved by an image processing method comprising steps of extracting the guide-wire points, forming strings from said extracted guide-wire points, temporally filtering the points located outside the strings, denoted background points, spatially filtering the points located on the strings denoting guide-wire points and inserting the spatially filtered guide-wire points in the image of the temporally filtered background points. An other problem lies in the elimination of phantom artifacts. This problem is solved by processing a sequence of two images and by selecting for insertion the guide-wire points that have been located on a string in at least one of the two images. An other problem lies in the lack of contrast of the original images. This problem is solved by applying local intensity enhancement on the spatially filtered guide-wire string points and inserting the resulting enhanced guide-wire string points in the image of the temporally filtered background points.

Figure 1:
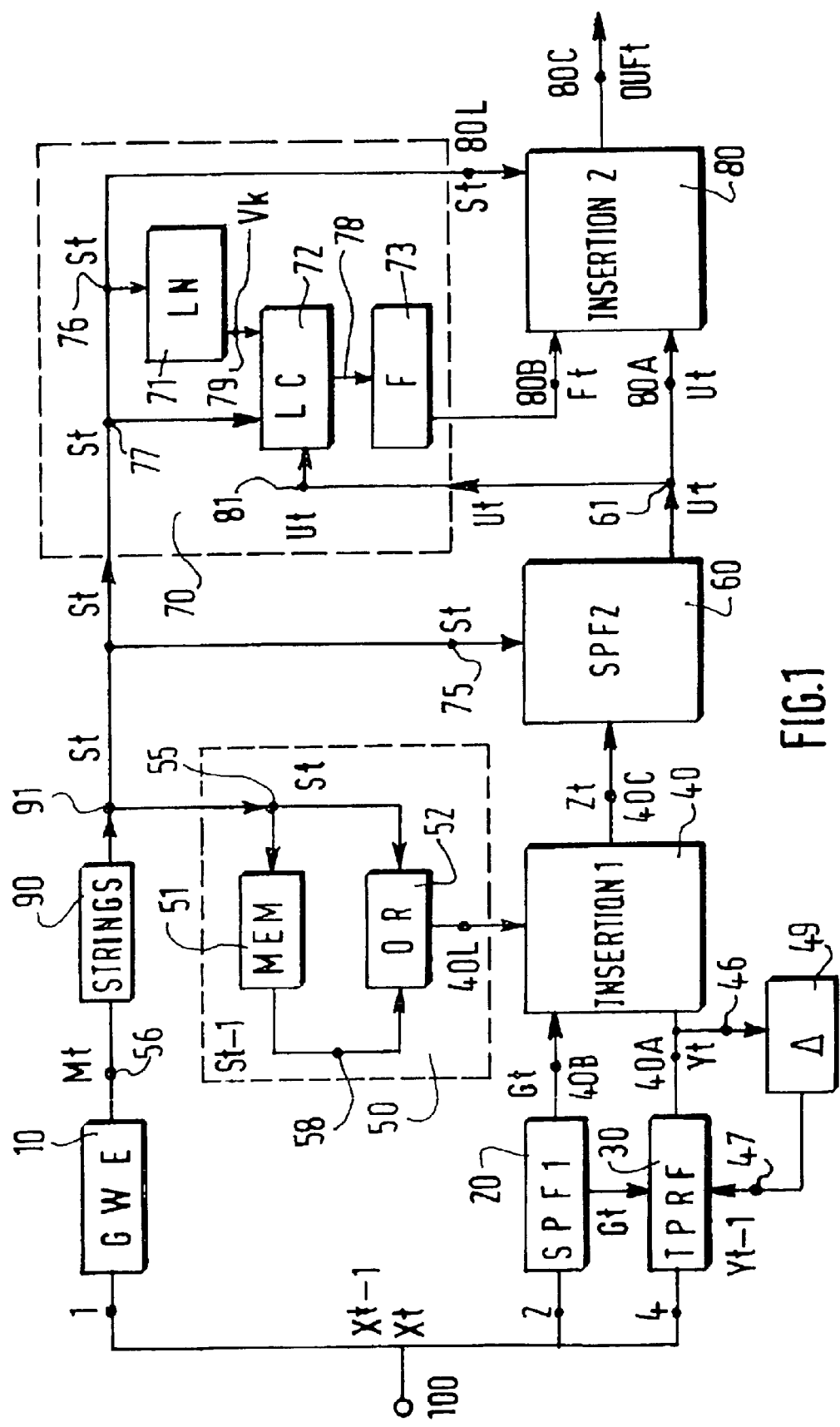
FIG. 1 is a functional block diagram illustrating the steps of the method.
Figure 2A:
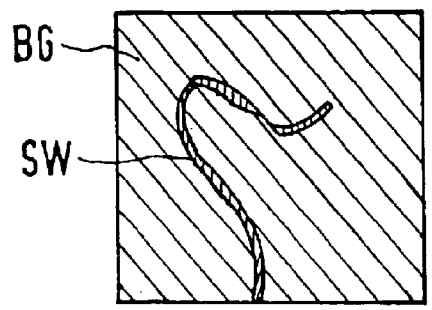
FIG. 2A shows an original image of a guide-wire on a background.
Figure 2B:
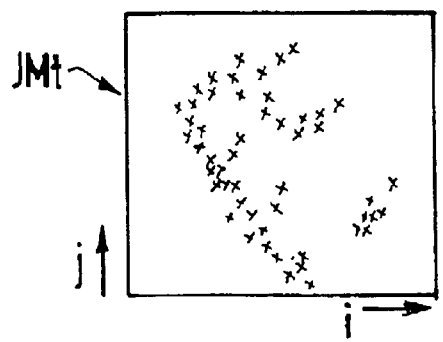
FIG. 2B shows an image of guide-wire extracted pixels supplied by the GWE operation.
Figure 2C:
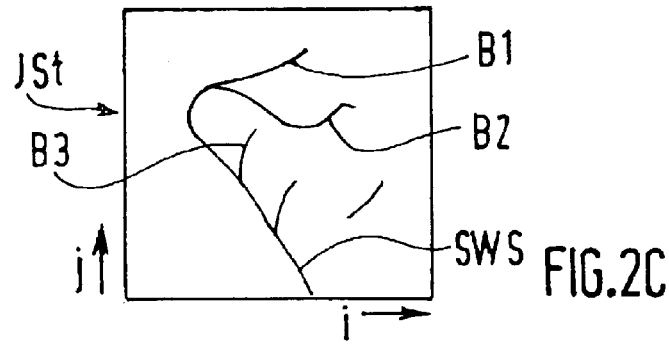
FIG. 2C shows an image of strings with branches.

Referring to FIG. 1, the method comprises the main operations of:

acquisition 100 of digital intensity signals $X_{t-1}$ or $X_t$ of an arteriogram image representing a guide-wire OW on a background BG, as shown in FIG. 2A;

extraction 10 of the guide-wire points from the arteriogram image, meaning detection and location of the guide-wire points, providing a binary signal $M_{t-1}$, $M_t$ of detected guide-wire points associated to their co-ordinates i, j, as shown in FIG. 2B;

string formation 90 from the extracted guide-wire points for providing a string signal St(i, j) of numbered string points, with their co-ordinates i, j, as shown in FIG. 2C;

insertion 40 of spatially noise filtered guide-wire intensities of points located on the strings in an image of temporally recursive noise filtered intensities of points not located on the strings, referred to as background points;

spatial filtering 60 of the intensities of the numbered guide-wire points located on the strings, considered as temporal samples;

local enhancement 70 of the spatially filtered guide-wire string point intensities;

and insertion 80 of the enhanced spatially filtered guide-wire point intensities located on the strings in the already temporally filtered background image for providing final filtered samples denoted OUFt representing the final filtered image.

This method also comprises a step 50 of elimination of phantom artifacts, which is performed using two successive arteriogram images in a sequence. The use of two images also permits performing temporally recursive filtering for noise filtering the background.

As described in more detail hereafter, the following method is preferably carried out using two successive images of an image sequence, including a first image referred to as causal image acquired at a first instant t−1, and a second image referred to as present image acquired at a second instant t. This method performs the processing of the image points according to a standard scanning of the images so as to filter each current point one after the other. The co-ordinates of the current point in the images are denoted i, j and the intensity values, referred to as samples, at this location i, j in the causal and present original images, are respectively denoted $X_{t-1}$, $X_t$. This method is performed in real time, that is to say at a rate of about 25 images per second.

In this image processing method, the filtering of the background is preferably carried out using a temporal recursive adaptive filter. Temporal filters are generally known as giving the best filtering results in image sequences representing objects without motion. In image sequences representing objects with motion, temporal recursive filter that are made adaptive to motion may be used. However, in that case, complete moving-detail preservation is virtually impossible. So, using a temporal recursive filter in an image sequence comprising a moving object as thin as said guide-wire may expose so thin a structure to some amount of degradation. In fact, a temporal recursive filter relies on pixel-wise fuzzy decisions regarding the motion occurrence between consecutive images. Since these decisions are fuzzy and since X-ray fluoroscopic images are usually very noisy, a temporal filter fails to completely preserve weakly contrasted moving objects because it fails to reach certainty about the occurrence of motion. It is the reason why, according to the present method, the guide-wire points are extracted and then these guide-wire points are not temporally filtered. Instead, the extracted guide-wire points are processed in order to be spatially filtered.

Figure 2D:
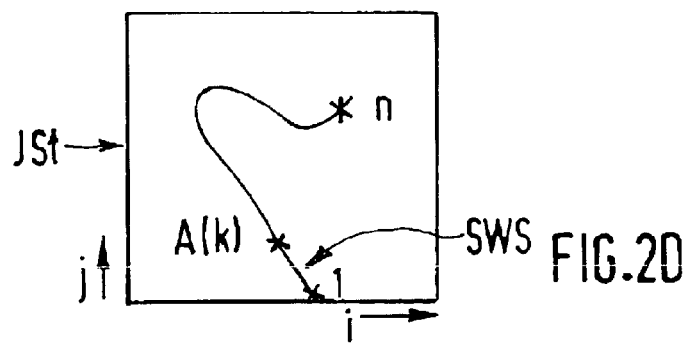
FIG. 2D shows an image of an independent string.

In reference to FIG. 2A, the guide-wire points are extracted one image at a time, on a purely spatial basis, that is, regardless of its motion content. To that end, each original image is first scanned in order to determine whether the current point pertains to the image background BG or to the guide-wire GW. Then each guide-wire point is extracted. In reference to FIG. 2B, based on the extracted points, strings of points are formed in order to eliminate guide-wire boundary points and to keep guide-wire central points for further processing. In reference to FIG. 1, a recursive temporal filtering RTPF is applied to those points that are not extracted as string points and thus are denoted background points, whereas a spatial filtering SPF1 is applied to those points that are extracted as guide-wire string points. So, at a string point location, which is a guide-wire point location, as the probability of movement is high, no temporal filtering is performed; instead, a spatial filtering is performed; whereas, at a non-string point location, which is regarded as a background point location, as the probability of movement is low, temporal filtering is allowed to be performed. FIG. 1 shows diagrammatically the detailed steps of the processing method for noise reduction in the images of a sequence representing a moving guide-wire as described above. This method provides a final filtered sample denoted OUFt relative to each current point at a location i, j for reconstructing a filtered image at time t from the samples $X_{t-1}$, $X_t$ of the casual and present images. These detailed steps are:

acquisition 100 of the samples $X_{t-1}$, $X_t$ of the current point located at the co-ordinates i, j respectively in the causal and present images of the sequence;

guide-wire extraction 10 performed by an extraction module denoted GWE receiving at its input 1 said samples Xt−1, Xt, and providing at its output 56 respective binary samples Mt−1, Mt, which are either a data 1 for a current point that is a guide-wire point or a data 0 for a current point that is not a guide-wire point, thus is regarded as a background point; associated to the binary data values Mt−1, Mt related to points, are the co-ordinates i,j of said points; this provides an image denoted IMt of the guide-wire points of intensity 1 represented on a background of intensity zero, at the instant t, as shown in FIG. 2B;

string formation 90, which transforms the image IMt of the extracted guide-wire points into strings of chained points also referred to as connected points; a string point pertains to a set of connected points, so as each string point has two connected neighbors, except the two end points of the string, which have each only one neighbor; the step of string formation 90 may provide several strings or strings having several branches, for example B1, B2, B3 . . . as represented on FIG. 2C; in that last case, the points that are common to several branches are called multiple-points and have to be detected using an operation of point detection known of those skilled in the art; this operation of point detection is followed by an operation of branch separation at the location of the multiple-points and evaluation of the most probable strings denoted SWS; FIG. 2D shows an example of such an image, denoted ISt, at the instant t; the output 91 of the string module 90 supplies a list St(i, j) of connected points characterized by point running numbers 1, 2, . . . k, . . . n on the string SWS and by the co-ordinates i, j of said string point in the image ISt, such as: i1,j1; i2,j2; . . . ; ik,jk; . . . in,jn; the string formation step may be carried out using morphological filters performing a thinning operation providing structures denoted skeletons of extracted points; then, these skeletons are the base of constitution of the string SWS;

spatial filtering 20 performed by a purely spatial filter module denoted SPF1, which receives at its input 2 the sample Xt of the present image, and provides at its output 40B a spatially filtered sample referred to as gate sample denoted Gt; this spatial filtering operation is not compulsory: the original signal Xt may be used directly in the further step 40 instead of the gate signal Gt because spatial filtering will be performed in further steps of the image processing method; however said spatial filtering operation 20 is recommended in order to smooth the sample Xt, which in every case improves said method;

temporal filtering 30 performed by a temporal recursive filter module denoted TPRF, which receives at its input 4 said samples Xt−1, Xt of the causal and present images, and provides at its output 40A a temporally filtered sample denoted Yt. This temporal filter is connected to a loop 49 providing a delay A, which receives at its input 40A the filtered sample Yt and supplies at its output 47 a stored causal sample Yt−1 for the temporal filter TPRF to perform a recursive temporal filtering.

The string formation operation provides several advantages: The guide-wire is replaced by a string structure meaning that the blurred boundary points are now eliminated and that only guide-wire central points are processed. This operation also provides the list signal St(i,j) which is a control signal for the construction of the further filtered images.

The operations of string formation, spatial filtering and temporal filtering are performed in parallel. In an example of realization, the extracting module 10 denoted GWE, which performs the guide-wire point extraction, may comprise means or steps as those described in the EP0840252. The purely spatial filter 20 denoted SPF1, which provides the gate signal Gt from the original signal Xt, may be a spatial FMH (FIR-Median-Hybrid) filter such as described for example in the EP0755023. Such FMH filters show a good preserving ability for thin structures. A temporal recursive filter which can adapt itself to intensity discontinuities due to motion or noise peaks is already known, for example, of EP0751482. Such a filter is well adapted to be used in the present method.

Now, the processing method further comprises an insertion step 40 performed by a module denoted INSERTION 1, which issues at its output 40C, a signal Zt(i,j) that depends on the location of the current point; said output signal Zt(i,j) is:

either the gate sample Gt(i, j), supplied by the spatial filter module SPF1 to the INSERTION 1 module input 40B, when the current point is determined as a string point by a signal control that is present at an input 40L of the INSERTION 1 module; in that case, the current point is in the list St(i,j) at said location i, j at the present time t, or the temporally filtered sample Yt(i,j), supplied by the temporal filter TPRF to INSERTION 1 module input 40A, when the current point is determined as a non-string point by the signal control at the input 40L of INSERTION 1 module; in that case, the current point is not in the list St(i,j) at said location i,j at said present time t and is regarded as a background point.

The list signal St(i,j) is a binary control signal 1 or 0 applied to the input 40L of the INSERTION 1 module 40. So, the INSERTION 1 module 40 inserts the intensities of the gate samples Gt at the locations id of the current points that are in the list St(i,j) of guide-wire string points, and inserts the intensities of the temporally filtered samples Yt at the locations i,j of the current points that are not in the list St(i,j) and that are non-string points, i.e. background points. In a general manner, the INSERTION 1 module 40 inserts the intensity image of the strings into the temporally filtered intensity image of the background.

The binary control signal at node 40L is provided by the binary output data of the string formation module 90 modified by a module 50 denoted PHE devised for eliminating phantom artifacts. The PHE module receives the binary string signals St−1, St at the node 56. The causal binary signal St−1, which is received first, is stored in a memory or a delay 51 of the PHE module so as said causal sample St−1 may be available at node 58 at the present instant t at the same time as the present binary signal St is available at node 55. Then, nodes 55 and 58 constitutes the inputs of a logic OR 52 which delivers at the output 40L a binary signal equal to 1 every time that at least one of its inputs is equal to 1, or a binary signal equal to 0 only when both its inputs are equal to 0. This means that the output 40L of the PHE module 50 delivers a signal 0 corresponding to the presence of a non-string point, referred to as background point, uniquely when both causal and present binary signals St−1, St are themselves equal to 0, or a signal 1 corresponding to the presence of a guide-wire string point at the location i, j in all other cases, that is when at least one of the two binary samples St−1 and St is equal to 1 corresponding to the actual presence of a string point at the location i, j in at least one of the two images, the other image actually showing a non-string point, called background point.

The output 40L of the PHE module 50 constitutes the binary control signal of the INSERTION 1 module 40, which selects the gate sample Gt for further image processing when the PHE module outputs 1 corresponding to the actual presence of a string point whether in both the causal and present images or in only one of said images, or which selects the temporally filtered sample Yt(i,j) for further image processing uniquely when the PHE module issues a signal 0 corresponding to the actual presence of non-string point, called background point, in both said images. Thus, the temporal filter is not allowed to provide a filtered sample Yt(i,j) which is a smoothed combination of intensities at location i, j of samples at instants t−1 and t corresponding respectively to a non-string sample, denoted background sample, and to a string sample. It results that a string point which is present in i,j at the causal instant t−1 and which is no more present at the instant t is not allowed to show through the image reconstructed at the present instant t since the temporal filter is only allowed to provide filtered samples corresponding to non-string points, denoted background points. So, spatially filtered intensities Gt(i,j), which are spatially filtered images of string points at the instant t, are inserted onto the phantom points, which were string points at instant t−1, whereas spatially filtered intensities Gt(i,j), which are spatially filtered images of string points at the instant t, are inserted uniquely at the location of corresponding string points. The phantom artifacts due to temporal filtering are eliminated. Only spatially filtered images of guide-wire points, located on strings, are allowed to be inserted in the temporally filtered images of background points. The INSERTION 1 module 40 supplies at its output 40C the appropriate filtered sample Gt(i,j) or Yt(i,j) for forming the image signal Zt(i,j).

The insertion operation 40 provides several advantages: In the temporal recursive process, the points belonging to the moving guide-wire at time t, which might have been partly impaired, are fruitfully replaced by their spatially filtered counterparts. Also in the temporal recursive process, the points corresponding to the locations that the moving guide-wire occupied in the previous image, at time t−1, which might have been corrupted by phantom artifacts, consisting in that the guide-wire points at time t−1 shows through the image at time t, are fruitfully replaced by their spatially filtered counterparts. The quantum noise of the background is reduced.

Now, the processing method comprises steps for noise filtering and enhancing the intensity of the guide-wire string points. For carrying out these steps, it is important to note that the list St(i,j) is used as a control signal to select the string points in the processed images. Referring to FIG. 1, these further processing steps are:

spatial filtering 60 performed on the image signal Zt(i,j) using a spatial filter module SPF2, which receives the image sample Zt(i,j) at its input 40C, the string signal St(i,j), giving the co-ordinates i,j of the string points, at its control input 75 and which performs spatial filtering on the points belonging uniquely to the strings, string by string. In fact, the guide-wire string point intensities in the image Zt(i,j) may be regarded as forming a temporal intensity signal denoted Ht(i,j) constituted of the samples Gt(i,j) considered between the start point corresponding to the first end point numbered 1 of the string SWS and the terminal point corresponding to the second end point numbered n of said string. Said temporal intensity signal Ht(i,j) propagates from the start point to the end point. Each sample Gt(i,j) of a guide-wire string has a number on said string, which is given by the string signal St(i,j) and which is similar to a time co-ordinate in a standard temporal intensity signal. So, a recursive temporal filtering technique can be applied to the samples Gt(i,j) of the strings in the image Zt(i,j) in the same way as to a standard temporal intensity signal. To that end, the guide-wire string points are scanned along the string according to their point number on said string, which is delivered by the string signal St(i,j) together with their co-ordinates in the image. The string point intensity is spatially filtered one point after the other in a causal direction, for example from the start point to the terminal point. Then said string point intensity can be further spatially filtered one point after the other in an anti-causal direction, for example from the terminal point to the start point in order to provide a recursive filtering with two passes, as in a temporal filtering technique. It has been found that two such passes in a causal and anti-causal direction provide a good noise filtering of the string point intensities in the Zt(i,j) image signal. The SPF2 module issues a noise filtered image signal Ut(i,j) at its output 61, which comprises the spatially filtered string point intensities denoted Ht(i,j) and the background temporally filtered intensities Yt(i,j). The guide-wire represented by said filtered string point intensities shows no more boundaries with unpleasant sputtering and is agreeably noise filtered with elimination of noise peaks.

Figure 3:
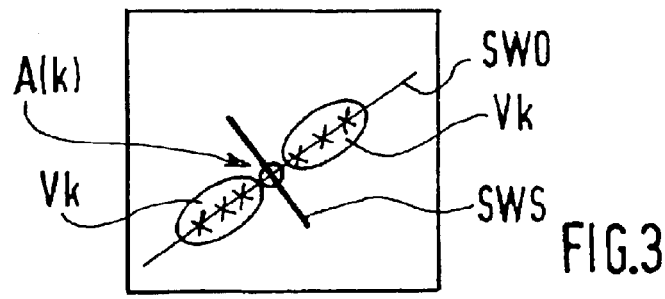
FIG. 3 illustrate the step of local enhancement of the string point intensities.

To improve the visualization of the guide-wire in the difficult fluoroscopic images, the contrast of the guide-wire string point is further enhanced with respect to the background using an enhancement module 70 that receives the image signal Ut(i,j) with the noise filtered string point intensities Ht(i,j) at its input 61 and the string signal St(i,j) at its control input 91. This enhancement step 70 comprises operations of:

determination 71 a local neighborhood denoted V related to each point of a string, using a computation module denoted LN, which receives the string signal St(i,j) at its control input 76. As illustrated by FIG. 3, a point A(ik,jk) of the string SWS is localized by its co-ordinates ik, jk given by the string signal St(i,j). Related to the string point A(ik,jk), a neighborhood Vk is determined; to that end the string direction is first evaluated by a mean value of the directions of said string SWS. Then the orthogonal direction SWO is evaluated from the string direction and the coordinates of about 3 points each side of the string SWS on said orthogonal direction SWO are determined, forming said neighborhood Vk;

estimation 72 of the local contrast at the point A(ik, jk) using a computation module denoted LC, which has an input 79 for the Vk neighborhood, an input 81 for the image signal Ut(i,j) and a control input 77 for the string signal St(i,j)t; as illustrated by FIG. 3, a mean value of the intensities of the neighborhood points in Vk, which are non-string points and thus are background points, is estimated from the Ut(i,j) signal and denoted $\overline{U}(Vk)$; the intensity of the given point A(ik,jk), which is a string point, is estimated from Ut(i,j) and denoted Ut(ik,jk); the local contrast LC(ik,jk) is computed as the difference between the mean intensity on the neighborhood Vk and the intensity at the string point A(ik, jk):

$$LC(ik,jk) = \overline{U}(Vk) - U(ik,jk) \qquad (1)$$

amplification 73 of said local contrast LC(ik,jk) by a predetermined factor C>1, using a multiplier module 73, which receives the local contrast LC(ik,jk) and which issues a signal Ft(ik,jk) related to said string point A(ik, jk):

$$C. \ LC(ik,jk) = C \times \overline{U}(Vk) - C \times U(ik,jk) \quad (2)$$

$$C. \ LC(ik,jk) = \overline{U}(Vk) - Ft(ik,jk) \quad (3)$$

The signal Ft(ik,jk) is an enhanced intensity signal to be applied on the already spatially filtered string point A(ik,jk), whose calculation is based on the equations (2) and (3):

$$Ft(ik,jk) = [C \times U(ik,jk)] - [(C-1) \times \overline{U}(Vk)] \quad (4)$$

Now, the enhanced string point intensity signal, denoted Ft(i,j), is calculated for all the points of the string SWS using formula (4) and is inserted into the image signal Ut(i,j) at the coordinates of the string points given by the string signal St(i,j). This operation is performed by a module 80, denoted INSERTION 2, which receives the image signal Ut(i,j) at its input 80A, the enhanced string point signal Ft(i,j) at its input 80B and the control signal St(i,j), which is the string signal, at its control input 80L. The INSERTION 2 module 80 performs said insertion operation for issuing at its output 80C, a signal OUFt(i,j) that depends on the location of the current point, which is:

either the enhanced spatially filtered sample Ft(i,j) related uniquely to string point intensities, supplied by the enhancement module 70 to the INSERTION 2 module 80 at its input 80B, when the current point is determined a string point of the list St(i,j) at said location i, j at the present time t, by said control signal applied at its input 80L:

$$OUFt(i,j) = Ft(i,j) = [C \times U(i,j)] - [(C-1) \times \overline{U}(V)] \quad (5a)$$

$$OUFt(i,j) = Ft(i,j) = C.LC(i,j) - \overline{U}(V)] \quad (5b)$$

or the temporally filtered sample Yt(i,j), supplied by the INSERTION 1 module 40 to the INSERTION 2 module 80 at its input 80A, when the current point is determined as a non-string point by the control signal at the input 80L; the current point is not in the list St(i,j) and is considered as a background point at said location i,j at said present time t.

$$OUFt(i,j) = Yt(i,j) \quad (6)$$

So, the INSERTION 2 module inserts the enhanced spatially filtered intensities of the string points into the temporally filtered intensities of the background, which means that the insertion module inserts the spatially filtered image of the strings into the temporally filtered image of the background. This INSERTION 2 module issues an image signal OUFt(i,j) at its output 80C, which constructs at the instant t the final filtered image.

In a variant of the method, the strings may be 2 or 3 points width instead of purely one point width as described above. In this case, the operations above-described for the one point-wide string are applied on all points constituting the several point-wide strings. In any case, the string structure looks like a regular ribbon instead of the original irregular threadlike structure that is the original image of the guide-wire above-described as example.

Figure 4A:
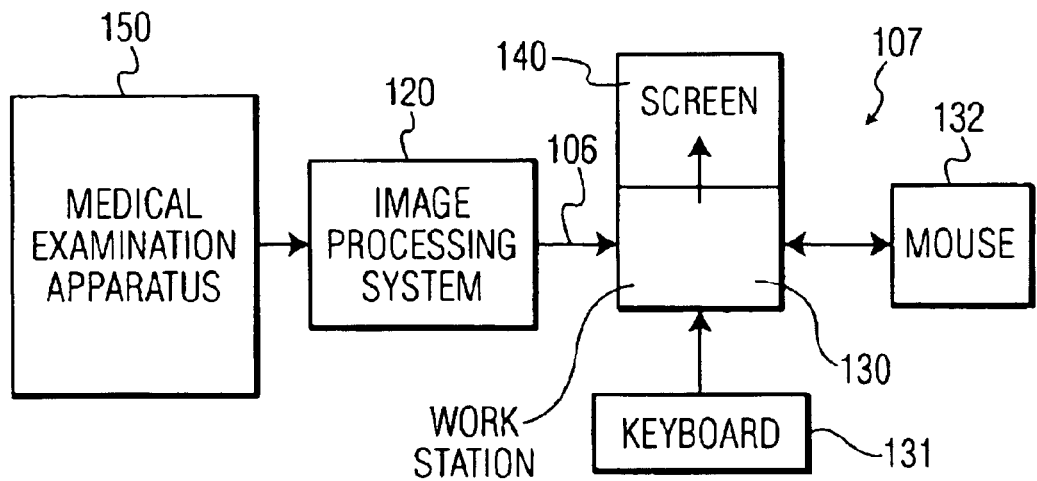
FIG. 4A is a functional block diagram illustrating an examination apparatus having a system and means for carrying out the method of FIG. 1.

Referring to FIG. 4A, image data of an image sequence, provided for instance by a medical examination apparatus 150, is further provided to an image processing system 120 for processing the data according to the above-cited method. This image processing system 120 may be a suitably programmed computer, a processor of a workstation 130, or a special purpose processor having circuit means such as LUTs, Memories, Filters, Logic Operators, that are arranged to perform the functions of the method steps according to the invention. The workstation 130 may also comprise a keyboard 131, a screen 140 and a mouse 132. The processing system may be connected to storing means to store the medical images.

Figure 4B:
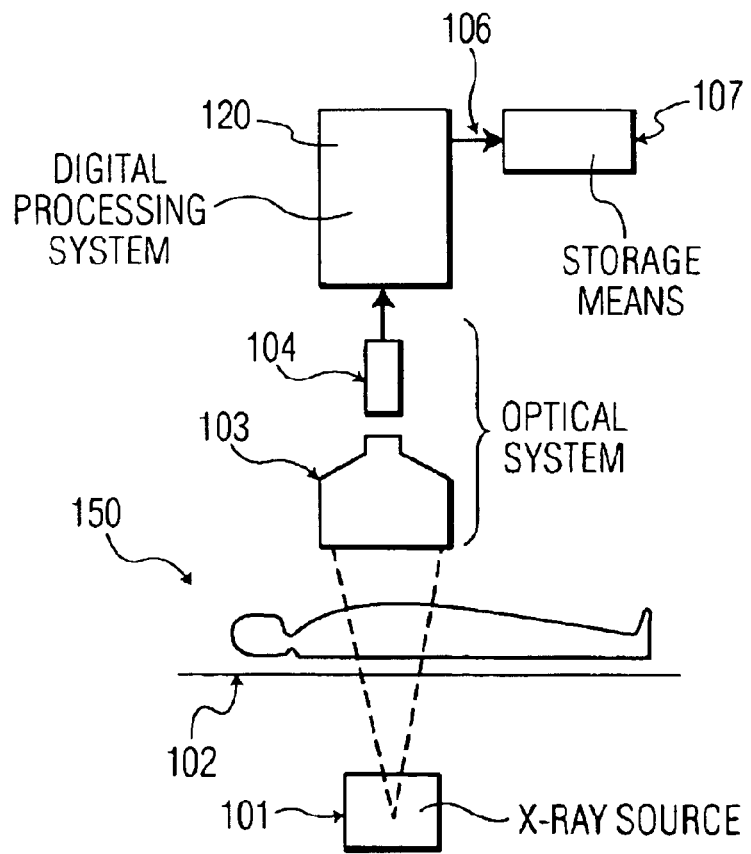
FIG. 4B illustrates an X-ray apparatus for providing image data to a processing system. apparatus for providing image data to a processing system.

Referring to FIG. 4B, an X-ray medical examination apparatus 150 comprises means for acquiring digital medical image data of a sequence of images at least comprising a causal and a present images, and a digital processing system 120 for processing these data according to the processing method described above. The X-ray apparatus comprises an X-ray source 101, a table 102 for receiving a patient to be examined, an optical system 103, 104 for providing image data to the processing system 120 which has at least one output 106 to provide image data to display and/or storage means 107. The display and storage means may respectively be the screen 140 and the memory of a workstation 130 as described in relation to FIG. 4A. Said storing means may be alternately external storing means.

What is claimed is:

1. An image processing method for noise filtering an image sequence representing a threadlike structure on a background, including an acquisition of point data in first and second sequence images and an estimation of the corresponding filtered point data for constructing a filtered second image, the point data being the intensities associated to co-ordinates of image points, said method comprising, performed in each sequence image, the steps of:

extracting the threadlike structure points, forming strings from said extracted points, temporally filtering the data of the points located outside the strings denoted as background points, spatially filtering the data of the string points, constructing the filtered second image data by performing an insertion of the spatially filtered data of the string points into the temporally filtered data of the background points, based on the string formation performed in said sequence images, providing a binary control signal formed of a list of the string points with their running number on the strings and their co-ordinates in the processed image, which determines whether the current point is a string point or a non-string point regarded as a background point, supplying said binary control signal for controlling the insertion of the spatially filtered data of the string points into the temporally filtered data of the background points, and delivering said binary control signal for controlling the insertion operation through a logic OR operation, whose inputs are first and second binary control signals related to the first and the second sequence images, said OR operation triggering the spatially filtered data when at least one of the first and second binary control signals corresponds to a string point.

2. A method as claimed in claim 1, including a spatial filtering operation performed on string point data, comprising the steps of:

selecting string points [A(i,j)] using the list of the control signal [St(i,j)], propagating on one string from its start point to its end point, according to the running number on the string, while propagating, performing a spatial filtering on each point of the string in a causal then in an anti-causal direction as using a temporal filtering technique, and constructing a filtered second image data by performing an insertion of the spatially filtered data of the string points into the temporally filtered data of the background points, controlled by the binary control signal.

3. A method as claimed in claim 2, for enhancing the string point data, comprising the steps of:

selecting a string point [A(i,j)] using the list of the control signal [St(i,j)], said string point having a spatially filtered intensity [U(I,j)], forming a neighborhood (V) for said string point using background points having temporally filtered intensities and estimating a mean temporally filtered intensity in said neighborhood [Ü(V)];

estimating the local contrast [LC(i,j)] related to said string point as a difference between said mean intensity in said neighborhood and the intensity of said string point and multiplying said contrast by a factor (C) for providing an enhanced contrast [C.LC(i,j)]; and calculating the enhanced string point intensity [Ft(i,j)] as the difference between the enhanced contrast and the mean intensity [Ü(V)] in the neighborhood (V) of said point.

4. A method as claimed in claim 3, including an enhancement operation performed on spatially filtered string point data, comprising the steps of:

selecting string points [A(i, j)] using the list of the control signal [St(i,j)], enhancing the string point data with respect to their local environment, and constructing a filtered second image data by performing an insertion of the enhanced spatially filtered data of the string points into the temporally filtered data of the background points, controlled by the binary control signal.

5. A method as claimed in claim 2, including an enhancement operation performed on spatially filtered string point data, comprising the steps of:

selecting string points [A(i,j)] using the list of the control signal [St(i,j)], enhancing the string point data with respect to their local environment, and constructing a filtered second image data by performing an insertion of the enhanced spatially filtered data of the string points into the temporally filtered data of the background points, controlled by the binary control signal.

6. A method as claimed in claim 1, wherein the images are medical examination digital images and the threadlike structure is a catheter guide-wire.

7. A system comprising a suitably programmed computer of a workstation or a special purpose processor having circuit means, which are arranged to process image data according to an image processing method for noise filtering an image sequence representing a threadlike structure on a background, including an acquisition of point data in first and second sequence images and an estimation of the corresponding filtered point data for constructing a filtered second image, the point data being the intensities associated to co-ordinates of image points, and having means to display images processed according to said method, and possible means to store the image data, said system comprising:

a means for extracting the threadlike structure points, a means for forming strings from said extracted points, a means for temporally filtering the data of the points located outside the strings denoted as background points, a means for spatially filtering the data of the string points, a means for constructing the filtered second image data by performing an insertion of the spatially filtered data of the string points onto the temporally filtered data of the background points, a means for providing a binary control signal, based on the string formation performed in said sequence images, formed of a list of the string points with their running number on the strings and their co-ordinates in the processed image, which determines whether the current point is a string point or a non-string point regarded as a background point, a means for supplying said binary control signal for controlling the insertion of the spatially filtered data of the string points into the temporally filtered data of the background points, and a means for delivering said binary control signal for controlling the insertion operation through a logic OR operation, whose inputs are first and second binary control signals related to the first and the second sequence images, said OR operation triggering the spatially filtered data when at least one of the first and second binary control signals corresponds to a string point.

8. An X-ray apparatus having means for acquiring medical digital image data and having a system as claimed in claim 7, having access to said medical digital image data for processing said image data.

9. A computer program product embodied in a computer readable medium comprising a set of instructions for carryig out a method as claimed in claim 1.

* * * * *